C. MILSTEAD.
COMBINED MOWER AND TEDDER.
APPLICATION FILED AUG. 22, 1910.
982,686.
Patented Jan. 24, 1911.
2 SHEETS—SHEET 2.
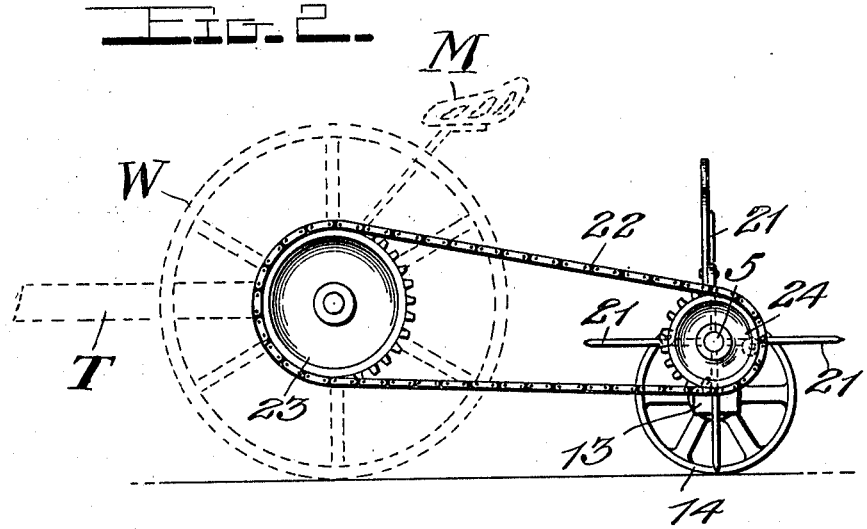
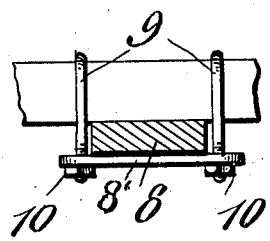
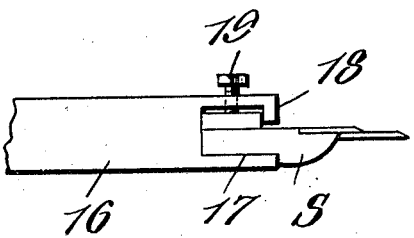
Witnesses
Chas. L. Griesbauer.
M. H. Peeder.
Inventor
C. Milstead,
By Watson E. Coleman.
Attorney

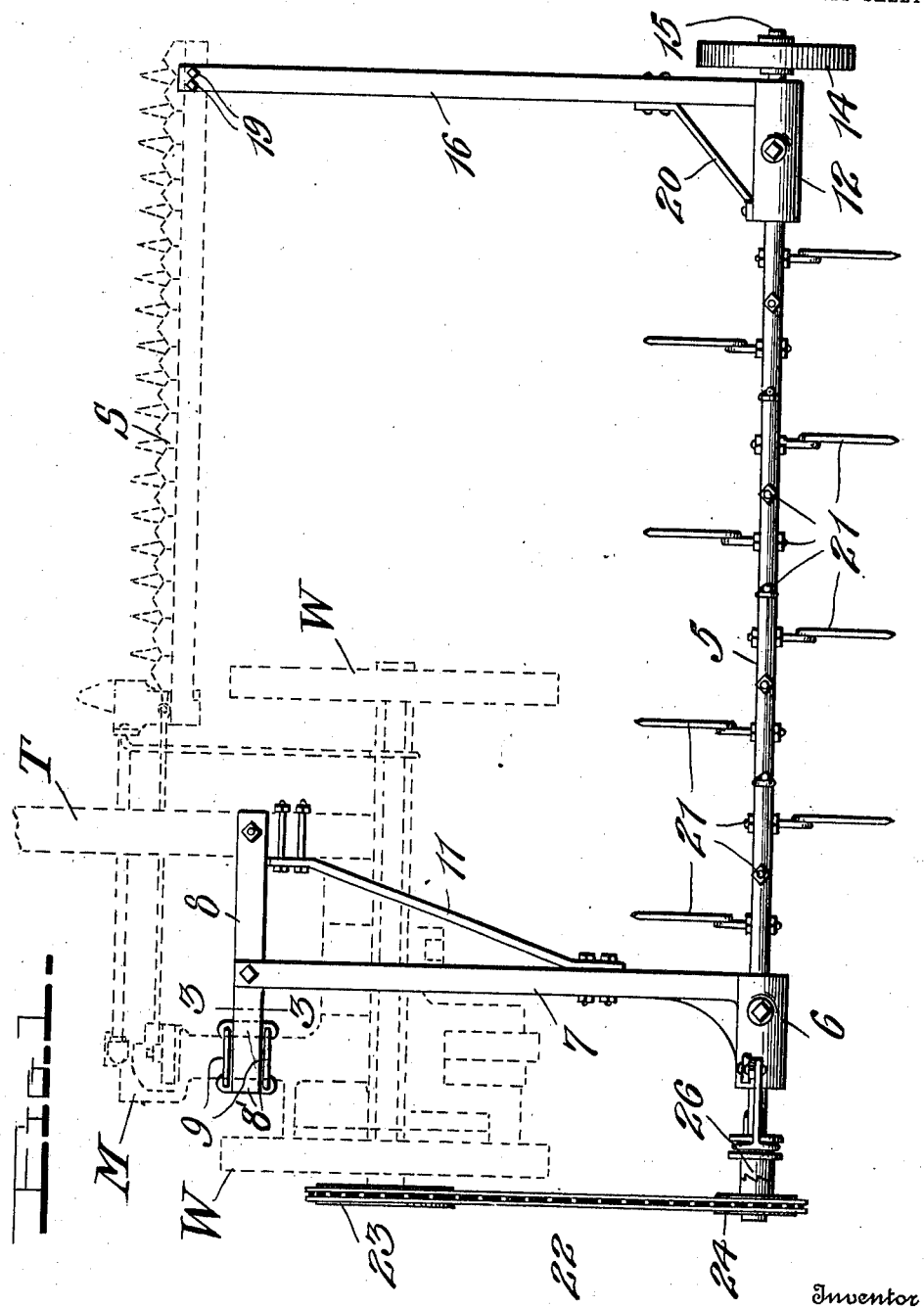

UNITED STATES PATENT OFFICE.

CARL MILSTEAD, OF CHATSWORTH, ILLINOIS.

COMBINED MOWER AND TEDDER.

982,686.

Specification of Letters Patent. Patented Jan. 24, 1911.

Application filed August 22, 1910. Serial No. 578,426.

*To all whom it may concern:*

Be it known that I, CARL MILSTEAD, a citizen of the United States, residing at Chatsworth, in the county of Livingston and State of Illinois, have invented certain new and useful Improvements in Combined Mowers and Tedders, of which the following is a specification, reference being had to the accompanying drawings.
This invention relates to improvements in agricultural machines, and more particularly to a combined mower and tedder, the invention having for its principal object the provision of means for quickly attaching to or detaching the tedder from the mower frame and sickle bar.

Another object of the invention is to provide a tedder attachment for mowers which may be easily and quickly arranged in operative position, strong and durable in construction and may be manufactured at a comparatively low cost.

With these and other objects in view, the invention consists of the novel features of construction, combination and arrangement of parts hereinafter fully described and claimed, and illustrated in the accompanying drawings, in which,—

Figure 1 is a top plan view of a machine embodying my improvements, the mower being in dotted lines. Fig. 2 is a side elevation thereof. Fig. 3 is a section taken on the line 3—3 of Fig. 1, and Fig. 4 is a detail end view of the sickle bar.
Referring more particularly to the drawings, M indicates the mower which may be of any approved construction and supported by the usual ground wheels W. A tongue T is secured at its rear end to the mower frame and extends forwardly thereof for the attachment of the draft animals. The usual sickle bar S extends laterally from one side of the machine and carries the reciprocatory cutter bar which is actuated by means of any preferred mechanism.

The tedder when in operative position is arranged rearwardly of the mower, as shown in Fig. 1. This tedder comprises a shaft 5 disposed in parallel relation to the sickle bar S. One end of the shaft 5 is mounted to rotate in a bearing 6 formed upon the rear end of a longitudinally extending arm 7. The forward end of this arm is bolted to a wooden cross bar 8, one end of which extends beneath the tongue T of the mower and is bolted thereto, as clearly indicated in Fig. 1. The other end of the cross bar 8 is secured to a portion of the mower frame by means of the U-shaped bolts 9 which extend around a longitudinally extending arm of the frame and have their extremities disposed through openings formed in the ends of the plates 8'. Nuts 10 are threaded upon the ends of these U-shaped bolts to rigidly secure the cross bar in position. An angularly extending brace bar 11 is bolted at one end to the rear end of the tongue T and at its other end to the longitudinally extending arm 7. This brace bar provides a very rigid support for the rear end of the arm 7 and bearing 6. The other end of the tedder shaft 5 is mounted in the journal bearing 12 which is formed with a depending boxing 13 in which the shaft 15 of a supporting wheel 14 is mounted. This wheel 14 supports the shaft in its horizontal position in the movement of the machine. A longitudinally extending arm 16 is formed on the bearing 12 and is removably secured at its end to the sickle bar S. The means for attaching the arm 16 to the sickle bar is shown in detail in Fig. 4. The end of the arm 16 is recessed, as shown at 17, to receive the sickle bar and is formed with a lip 18 which extends over the outer edge of said bar. Set screws 19 are adjustable through the end of the arm 16 into engagement with the sickle bar, to rigidly secure the arm thereon and prevent its longitudinal movement. A brace 20 also connects the arm 16 to the inner end of the bearing 5.

The usual resilient teeth 21 are secured to the shaft 5. These teeth may be of any desired form and of any preferred number. The shaft 5 is rotated through the medium of an endless driving chain 22 which passes over a sprocket wheel 23 carried by one of the ground wheels W of the mower and around a sprocket 24 loosely mounted upon the end of the tedder shaft 5. A sliding clutch 26 is arranged on the shaft 5 and is adapted to be actuated to lock the sprocket 24 thereon whereby power is transmitted from the driving wheel to the tedder shaft. Thus the tedder may be easily and quickly thrown into or out of operation.

From the foregoing it is believed that the construction and operation of my combined mower and tedder will be readily understood. The hay or other grain being cut will be engaged by the spring teeth 21 of the tedder in the movement of the machine over the ground so that the grain is thoroughly agitated and loosened. The tedder may be easily and quickly attached to or detached from the mower so that the mower may be used independently thereof. The machine is of great convenience in practical operation and obviates the necessity of going over the field a second time to loosen the grain which has been cut. The machine is also extremely durable and rigid in construction and may be manufactured at a comparatively low cost.

Having thus described the invention, what is claimed is:—

1. The combination with a mower including a wheel-supported frame and sickle bar, of a tedder comprising a rotary shaft having a plurality of spring teeth secured thereto, a ground wheel supported at one end of said shaft, bearings for the shaft, longitudinal arms extending from said bearings and secured to the mower frame and to the sickle bar, and operating connections between the wheel shaft of the mower and the tedder shaft.

2. The combination with a mower including a wheel-supported frame and tongue and a sickle bar, of a tedder arranged rearwardly of the mower comprising a shaft, bearings supporting said shaft at its ends, forwardly extending arms connected to the bearings, a cross bar secured to the mower frame between the wheels thereof, one of said arms being removably secured to said cross bar, means for attaching the other of said arms to the sickle bar, a supporting wheel at one end of said tedder shaft, a plurality of spring teeth carried by the shaft, and a driving connection between the wheel shaft of the mower and the tedder shaft for rotating the latter.

In testimony whereof I hereunto affix my signature in the presence of two witnesses.

CARL MILSTEAD.

Witnesses:
 ROSCOE MILSTEAD,
 M. E. MILSTEAD.